United States Patent [19]

Müller

[11] 4,167,482
[45] Sep. 11, 1979

[54] FILTERING METHOD AND APPARATUS

[76] Inventor: Hans Müller, Im Allmendli, 8703 Erlenbach, Switzerland

[21] Appl. No.: 840,007

[22] Filed: Oct. 6, 1977

[30] Foreign Application Priority Data

Oct. 11, 1976 [CH] Switzerland ............... 12913/76
Oct. 22, 1976 [CH] Switzerland ............... 13475/76
Jan. 18, 1977 [CH] Switzerland ............... 616/77

[51] Int. Cl.² .................................. B01D 39/06
[52] U.S. Cl. ................................. 210/68; 210/82; 210/95; 210/411; 210/500 R; 210/503; 55/512; 55/517; 55/DIG. 16
[58] Field of Search ............. 210/81, 82, 68, 409, 210/411, 414, 484, 496, 503, 505, 500 R, 483, 71, 95, 508, 509; 55/512, 514, 527, 528, DIG. 16; 23/288 R

[56] References Cited

U.S. PATENT DOCUMENTS

| | | | |
|---|---|---|---|
| 184,920 | 11/1876 | Simes et al. | 210/348 X |
| 2,076,980 | 4/1937 | Cooper | 210/505 X |
| 2,617,766 | 11/1952 | Emmett et al. | 210/96 R X |
| 3,062,379 | 11/1962 | Bryan | 210/500 R X |
| 3,240,344 | 3/1966 | Hoelscher | 210/340 |
| 3,589,521 | 6/1971 | Richter | 210/411 |
| 3,613,564 | 10/1971 | Adamski | 210/401 X |
| 3,803,810 | 4/1974 | Rosenberg | 55/527 X |
| 3,815,341 | 6/1974 | Hamano | 55/514 X |
| 3,853,501 | 12/1974 | Stringer | 210/500 R X |
| 3,861,881 | 1/1975 | Nowak | 23/288 R |

FOREIGN PATENT DOCUMENTS 768641 11/1971 Belgium ............... 210/508
971568 1/1951 France ............... 210/505

Primary Examiner—William A. Cuchlinski, Jr.
Attorney, Agent, or Firm—Michael J. Striker

[57] ABSTRACT

A filtering apparatus has a housing and a brush-like filter element in the housing. The filter element includes a support which is permeable to the liquid or gas to be filtered. A filtering medium is secured to the permeable support and is in the form of strands which may be formed from flexible natural fibers, synthetic resin fibers, glass fibers, graphite fibers or metal fibers. The strands are so arranged that they are pressed against the permeable support during a filtering operation. This causes the strands to form a mat on the permeable support. The liquid or gas must pass through the mat and is thereby filtered. A filtering method using the apparatus involves passing a liquid or gas through the filter element so that a mat for filtering the liquid or gas is formed by the strands, and the liquid or gas is purified after leaving the filter element. When the strands have been loaded with impurities, a rinsing fluid is passed through the filter element in a direction countercurrent to that of the flow during the filtering operation. This causes the strands to straighten and permits the rinsing fluid passing through the filter element to remove the impurities from the strands. The filter element is thereby regenerated and can again be used for filtering. The method and apparatus enable a filter element to be cleaned and regenerated without requiring replacement of the filter element and without requiring that the filtering apparatus be opened.

33 Claims, 16 Drawing Figures

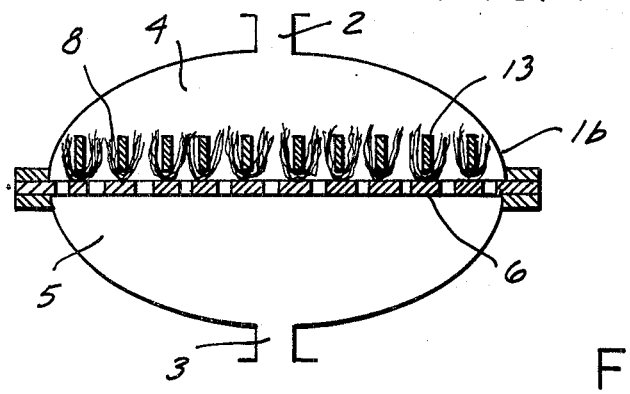
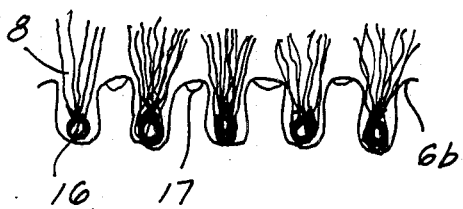
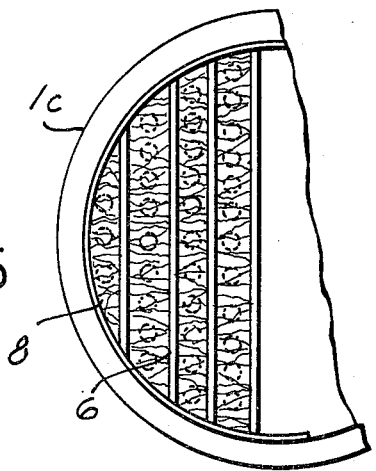
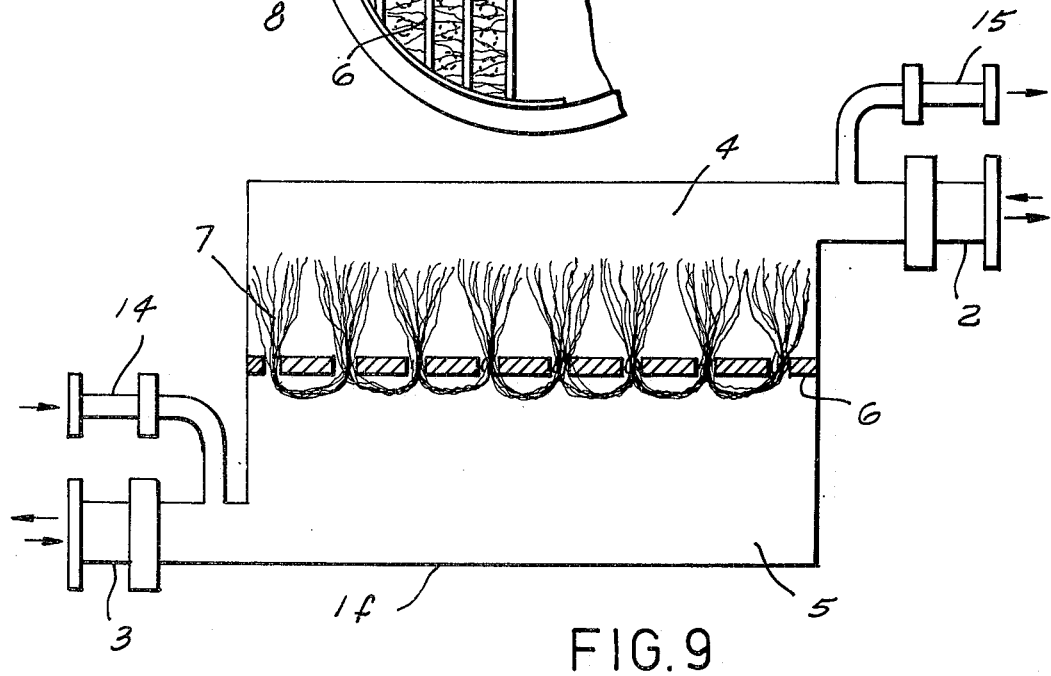

FILTERING METHOD AND APPARATUS

BACKGROUND OF THE INVENTION

The invention relates to a method and an apparatus for the filtration of liquids and gases.

More particularly, the invention relates to the filtration of liquids and gases using a filtering apparatus having a brush-like or mop-like filter element.

In all known filtering methods and apparatus, it is necessary to clean the filter element after a certain amount of use. The reason resides in that the filtering medium, which is the part of the filter element that removes suspended matter, e.g., particles, from the fluids undergoing filtration, becomes loaded with the suspended matter and no longer serves its function. The cleaning of the filter element may, for example, be accomplished by backwashing the filter element with a liquid or a gas, by scraping or rinsing the filter element or by subjecting the filter element to centrifugation. After the filter element has been cleaned, it is usually necessary to provide a fresh layer of filter material on the filter element. This may involve replacement of the entire filtering medium or deposition of a filter aid on the filter element. A disadvantage of this procedure resides in that the renewal of the layer of filter material consumes large amounts of material and is expensive.

Procedures for regenerating or cleaning the filter aids used in conjunction with filter elements are also known. These procedures may be carried out subsequent to wet or dry filtration and involve freeing the filter aid from the mud or dirt which is admixed therewith by sieving, washing or decantation. Thereafter, the filter aid may be re-used. These procedures are again troublesome as well as expensive.

The German Gebrauchsmuster 1,963,821 discloses a filtering apparatus having a removable filter element which is in the form of a brush. The filter element is provided with helical rows of bristles which become increasingly densely packed with decreasing distance from the outlet of the filtering apparatus. The bristles of the filter element serve as a filtering medium. In order to regenerate the filter element, it is removed from its housing and cleaned. This regeneration procedure is again expensive and also consumes large amounts of material.

SUMMARY OF THE INVENTION

It is an object of the invention to provide a method and apparatus for the filtration of liquids and gases which enable a filter element to be regenerated without opening the filtering apparatus.

Another object of the invention is to provide a method and apparatus for the filtration of liquids and gases which enable a filter element to be regenerated without replacing the filtering medium.

An additional object of the invention is to provide a method and apparatus for the filtration of liquids and gases which enable a filter element to be regenerated without the use of filter aids.

It is also an object of the invention to provide a method which enables a satisfactory filtration of liquids and gases to be achieved and which also enables the filter element used for the filtration to be regenerated without opening the filtering apparatus, without replacing the filtering medium and without using filter aids.

A concomitant object of the invention is to provide an apparatus for carrying out the method, which apparatus has a filter element that may be regenerated without opening the apparatus, without replacing the filtering medium and without using filter aids.

These objects, as well as others which will become apparent as the description proceeds, are achieved in accordance with the invention.

One aspect of the invention relates to a method of filtering fluids, i.e. liquids and gases. The method involves filtering a fluid medium by passing the latter through a filter element which includes a plurality of fixed, flexible strands or bristles of filtering medium forming a mat or bed which removes suspended matter, e.g. particulate matter, from the fluid medium. Subsequent to filtration of the fluid medium the filter element is rinsed by passing a rinsing fluid through the filter element in such a manner that the mat or bed is broken up at least in part and the strands or bristles are at least partially separated from one another. The rinsing fluid is thus able to effectively remove adherent matter from the strands or bristles so as to regenerate the filter element.

Another aspect of the invention relates to an apparatus for the filtration of fluids. The apparatus comprises a housing, and a filter element in the housing. The filter element includes a fluid-permeable support, and a filtering medium for removing suspended matter from fluids. The filtering medium comprises a plurality of fixed strands or bristles arranged so that a mat or bed of the strands or bristles is present on the support during the filtration of fluids to remove suspended matter from the latter.

The apparatus according to the invention may be used for carrying out a method in accordance with the invention.

A preferred embodiment of the method according to the invention is performed using a filtering apparatus having a brush-like or mop-like filter element arranged in a housing. The filter element includes a fluid-permeable support and a filtering medium in the form of strands. In accordance with the method of the invention, the stands are pressed against the support by the flow which exists during the filtration. Subsequent to the filtering operation, the strands are backwashed or rinsed by passing a rinsing fluid through the filter element in a direction countercurrent to the flow direction during the filtering operation. The rinsing fluid causes the strands to extend or straighten in the flow direction thereof and, in this manner, the strands are freed from the residues adhering thereto.

A preferred embodiment of the apparatus in accordance with the invention resides in that the strands are secured to the fluid-permeable support and are arranged on the latter in the form of bundles of brush-like or mop-like configuration.

The fluid-permeable support may, for example, be in the form of a plate provided with a plurality of apertures.

An embodiment of a filter element which has been found to operate satisfactorily includes a support which is fluid-permeable on one side thereof and has strands of a filtering medium arranged thereon in brush-like fashion.

The fluid-permeable support of the invention, which may serve as a filter plate, may have a vertical or horizontal orientation. The strands of filtering medium may be fastened to one side of the support only or to both sides of the support.

The strands may be secured to the fluid-permeable support via an adhesive or by pressing the stands onto the support.

The individual strands of filtering medium may be long or short and thick or thin. It is also possible to have mixtures of such different types of strands. A preferred embodiment of the invention contemplates a mixture of short, thick strands and long, thin strands. Here, the short, thick strands form a supporting layer for the overlying long, thin strands.

The individual strands may be constituted by a single filament or by multiple filaments. The filaments of a strand may be woven together.

The strands of filtering medium may include natural filaments as well as spun synthetic resin filaments of all types. The strands may also comprise graphite filaments, metallic filaments and glass filaments.

The filter element of the invention comprising the fluid-permeable support, e.g. a web or a plate, and the strands of filtering medium may be incorporated into pipes and tanks. The filter element may also be installed on drums, bands and candle-like elements of filters using such elements. In other words, the filter element of the invention may be used with all the known forms of apparatus utilized in filtering technology.

In fact, the filter element of the invention is well-suited for incorporation in conventional filtering apparatus.

Several filter elements of the invention may be used in a single filtering apparatus and, in such an event, the filter elements are favorably so arranged that they are spaced from another by distances corresponding to the lengths of the respective strands. The lengths of the strands favorably determine the distances between the individual filter elements both where the filter elements have a round, candle-like configuration and where the filter elements comprise plate-like fluid-permeable supports.

The thicknesses of the strands of filtering medium may range from a few microns to several millimeters. The lengths of the strands may range from about 1.5 centimeter to about 30 centimeters. The thicknesses and lengths which are to be used depend upon the fluid to be filtered and the desired degree of filtration. The thicknesses of the strands may be selected in such a manner that a sterilizing filtration may be carried out.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a schematic sectional view through an additional embodiment of a filtering apparatus according to the invention;

FIG. 4 is a schematic side view of an embodiment of a filter element according to the invention different from that used in the preceding apparatus;

FIG. 5 is a schematic top view of a further embodiment of a filtering apparatus according to the invention;

FIG. 9 is a schematic sectional view of a further embodiment of a filtering apparatus according to the invention;

DESCRIPTION OF THE PREFERRED EMBODIMENTS

Figure 1A:
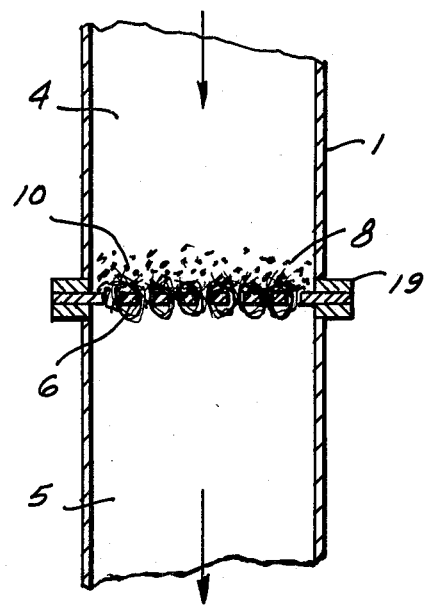
FIG. 1A is a schematic longitudinal sectional view through one embodiment of a filtering apparatus according to the invention during filtration.
Figure 1B:
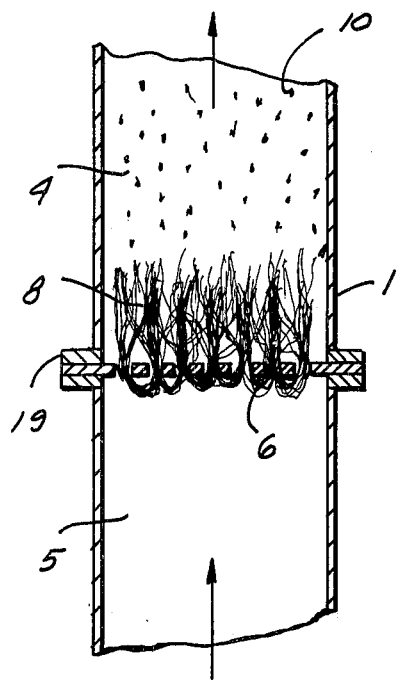
FIG. 1B is similar to FIG. 1A but shows the filtering apparatus during rinsing.

Referring to FIGS. 1A and 1B, it may be seen that these show a filtering apparatus which includes a tubular filter housing 1. The housing 1 may be the wall of a container or vessel for carrying out filtrations.

A support 6 which is here in the form of a plate, provided with a plurality of apertures or perforations, is mounted in the housing 1 and is secured to the latter via a pair of flanges 19. Long strands or bristles 8 pass through the perforations in the support 6 and are fastened to the latter. The strands 8 are arranged in bundles having a brush-like or mop-like configuration. The support 6 and strands 8 form a filter element of brush-like or mop-like configuration with the strands 8 serving as a filtering medium.

FIG. 1A shows the filtering apparatus during filtration. As indicated by the arrows, fluid to be filtered flows into the filter element 6, 8 from an inlet chamber 4. The fluid, which is here shown as having suspended matter or solids in the form of particles 10, causes the strands 8 to be pressed together as well as against the support 6. The strands 8 thus form a mat or bed on the support 6. While the fluid is able to flow through the mat, the latter is so dense that the particles 10 cannot penetrate it. Accordingly, the fluid is freed from the particles 10 in the filter element 6, 8. The fluid enters an outlet chamber 5 after passing through the filter element 6, 8.

When the strands 8 have become so loaded with the particles 10 that the filter element 6, 8 no longer functions effectively, the latter is cleaned or regenerated. As indicated by the arrows in FIG. 1B, this is accomplished by passing a rinsing fluid, which may be either a liquid or a gas, through the filter element 6, 8 in a direction countercurrent to the direction of flow during filtration. The rinsing fluid breaks up the mat of strands 8 and causes the latter to straighten and extend in the direction of flow of the rinsing fluid. The particles 10 are now able to break free of the strands 8 and are carried away therefrom by the rinsing fluid.

A filtering mat may be immediately formed once again by reversing the direction of fluid flow once more.

Figure 2:
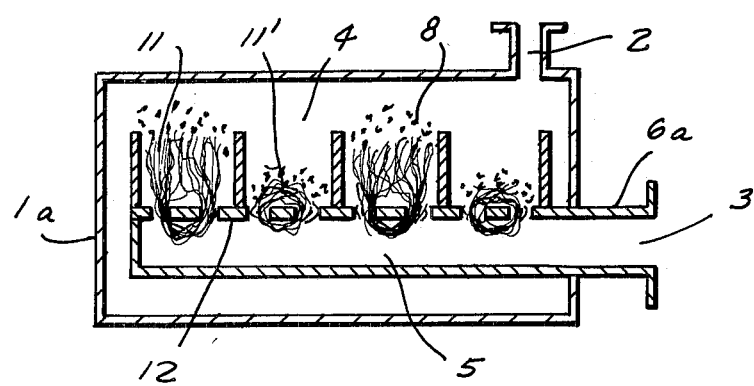
FIG. 2 is a schematic sectional view through another embodiment of a filtering apparatus according to the invention.

FIG. 2 shows a filtering apparatus having a filter housing 1a. The housing 1a is provided with an inlet 2 for fluid to be filtered and an outlet 3 for fluid which has undergone filtration.

A filter element is mounted in the housing 1a and includes a support 6a having strands 8 of a filtering medium fastened thereto. The strands 8 are again arranged in bundles of brush-like or mop-like configuration. The partition walls 12 reinforce the filter element 6a and give the strand bundles a guide during the filtration.

The support 6a may have either of two forms. On the one hand, it may comprise two juxtaposed plates of which one is perforate and the other is imperforate. If this were the case in FIG. 2, the upper plate shown, which holds the strands 8, would be the perforate plate whereas the lower plate shown would be the imperforate plate. On the other hand, the support 6a may comprise a tube having a perforate region which, in the case of FIG. 2, would be the upper surface of the tube, that is, the surface which holds the strands 8. In either event, the support 6a is here perforated on one side thereof only.

The support 6a divides the interior of the housing 1a into two chambers, namely, an inlet chamber 4 for the fluid to be filtered and an outlet chamber 5 for fluid which has undergone filtration. The inlet chamber 4 is formed exteriorly of the support 6a while the outlet chamber 5 is formed interiorly of the support 6a.

The support 6a is provided with dividing walls 12 which subdivide the region of the inlet chamber 4 adjacent the support 6a into sub-chambers 11 and 11'. Each of the sub-chambers 11 and 11' encompasses a plurality of the strands 8. FIG. 2 illustrates the strands 8 in the sub-chambers 11' as they appear during filtration whereas the strands 8 in the sub-chambers 11 are illustrated as they appear while rinsing with a fluid which flows countercurrent to the flow direction during filtration. Thus, the strands 8 in the sub-chambers 11' form filtering mats or beds whereas the strands 8 in the sub-chambers 11 extend in the direction of flow of the rinsing fluid.

The filtering apparatus of FIG. 3 has a housing 1b. A support 6 in the form of a perforate plate is arranged in the housing 1b and, together with the strands 8, forms a filter element.

In the embodiment of FIG. 3, the strands 8 do not pass through the perforations provided in the support 6. Rather, the strands 8 are pressed onto the surface of the support 6. This is accomplished by means of clamping walls 13 which exert a clamping effect on the strands 8 and thus cause the strands 8 to be secured to the support 6.

FIG. 4 shows a filter element which includes a support 6b in the form of a sheet or plate having a profiled configuration. The profiled configuration is such that the support 6b has alternating projections and depressions.

Bundles of the strands 8 of filtering medium are pressed onto the support 6b and, for the orientation of the support 6b illustrated in FIG. 4, the strands 8 are pressed into the depressions of the support 6b. The strands 8 are secured in the depressions by means of fastening rods 16. In the illustrated orientation of the support 6b, the projections thereof are provided with perforations 17 so as to permit fluid to flow through the filter element formed by the support 6b and the strands 8.

FIG. 5 illustrates a filtering apparatus having a housing 1c in the form of a tank. The housing 1c accommodates a plurality of filter elements arranged one above the other. Each of the filter elements in the housing 1c includes a support 6 in the form of a perforate plate and strands 8 of a filtering medium secured to the support 6. Adjacent ones of the filter elements 6, 8 are preferably separated by distances corresponding to the lengths of the respective strands 8.

Figure 6C:
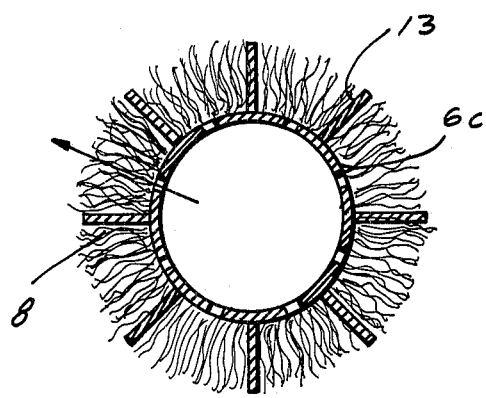
FIG. 6C is similar to FIG. 6B but shows the filter element during rinsing.
Figure 6A:
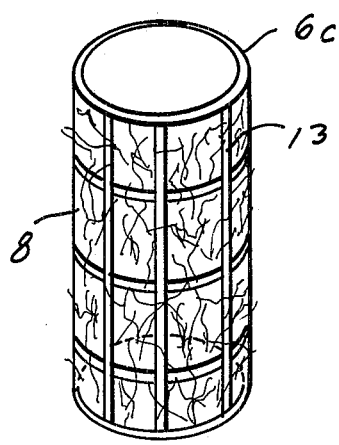
FIG. 6A is a perspective view of an embodiment of a filter element according to the invention which differs from the previous embodiment.
Figure 6B:
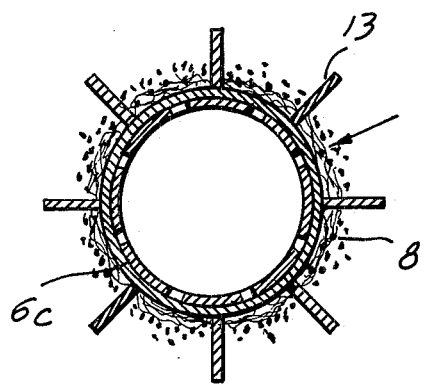
FIG. 6B is a top view of the filter element of FIG. 6A during filtration.

FIGS. 6A–6C illustrate a filter element of generally cylindrical configuration with FIG. 6A being a perspective view of several such filter elements arranged one above the other. Each filter element comprises a cylindrical support 6c having strands 8 of a filtering medium fastened thereto via clamping walls 13. FIG. 6B shows the filter elements 6c, 8 during filtration whereas FIG. 6C shows the filter elements 6c, 8 during the rinsing operation. The directions of fluid flow during filtering and rinsing are indicated by arrows in FIGS. 6B and 6C, respectively. The filter elements 6c, 8 are self-supporting during rinsing.

Figure 7A:
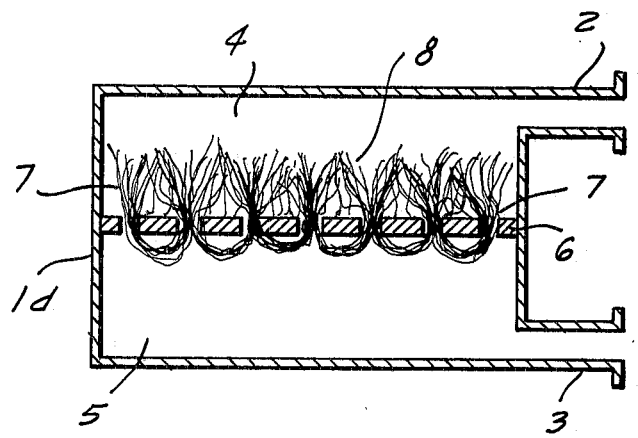
FIG. 7A is a schematic sectional view of still another embodiment of a filtering apparatus according to the invention.
Figure 7B:
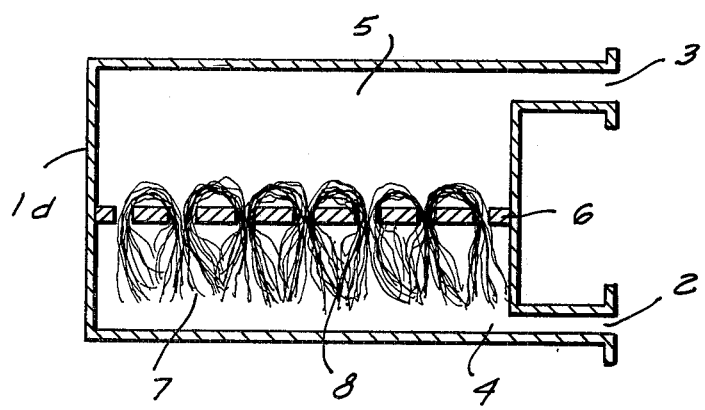
FIG. 7B is similar to FIG. 7A but shows the filter element of the filtering apparatus in a different orientation.

FIGS. 7A and 7B show a filtering apparatus having a housing 1d. A filter element is mounted in the housing 1d and includes a support 6 in the form of a perforate plate. Strands of a filtering medium are secured to the support 6 and, in the illustrated embodiment, comprise a mixture of long strands 8 and short strands 7.

FIG. 7A illustrates an orientation where the inlet chamber 4 for the fluid to be filtered is at the top of the housing 1d while the outlet chamber 5 for the filtered fluid is at the bottom of the housing 1d. During rinsing, which is the situation depicted in FIG. 7A, rinsing fluid is conveyed into the outlet chamber 5 from the outlet 3 provided for discharging the filtered fluid from the housing 1d. The rinsing fluid causes the strands 7 and 8 to extend in the direction of flow thereof which, in the present case, is the upward direction, and also causes the strands 7 and 8 to be relatively free of adhesion to one another. As a consequence, the strands 7 and 8 can be effectively cleaned by the rinsing fluid and, by virtue of the eddy currents created by the stream of rinsing fluid, the particulate matter adhering to the strands 7 and 8 is removed therefrom. The rinsing fluid, which is now loaded with the particulate matter from the strands 7 and 8, leaves the housing 1d via the inlet 2 provided for the fluid to be filtered.

Figure 7C:
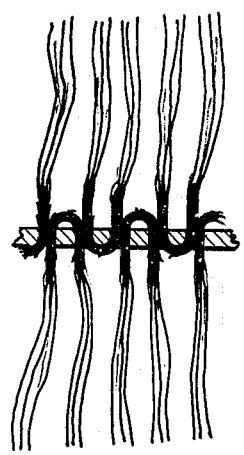
FIG. 7C is similar to FIGS. 7A and 7B but shows the filter element of the filtering apparatus in yet another orientation.

FIG. 7B illustrates an orientation where the inlet chamber 4 for the fluid to be filtered is at the bottom of the housing 1d whereas the outlet chamber 5 for the filtered fluid is at the top of the housing 1d. With this orientation, the strands 7 and 8 extend downwardly during rinsing, which latter is the condition shown in FIG. 7B. The rinsing fluid again flows from the outlet 3 to the inlet 2. In this situation, the particulate matter adhering to the strands 7 and 8 moves downwardly in the housing 1d and the removal of the particulate matter from the strands 7 and 8 is assisted by gravity. This is of particular advantage when the filter cake formed by the particulate matter is dried in the housing 1d inasmuch as the filter cake tends to drop when dry and may be readily removed from the housing 1d without the additional aid of mechanical devices. Some of the strands may lie above the support 6, whereas other strands may lie below the latter. This is illustrated in FIG. 7C.

Figure 8:
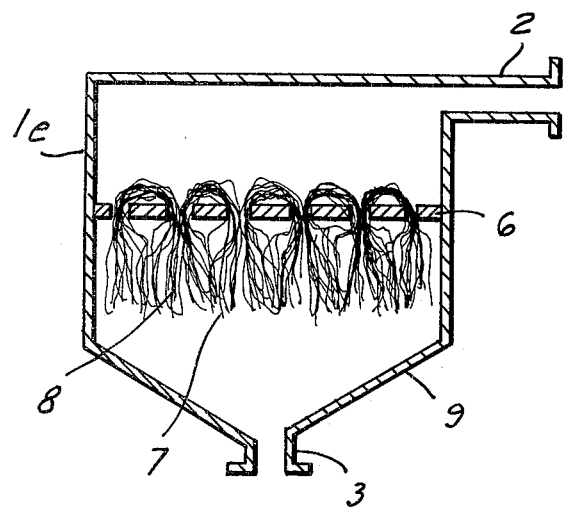
FIG. 8 is a schematic sectional view of an additional embodiment of a filtering apparatus according to the invention.

FIG. 8 shows a filtering apparatus having a housing 1e. This embodiment of the invention is characterized in that the housing 1e has an outlet end 9 of conical configuration. The conical configuration of the outlet end 9 of the housing 1e simplifies the removal from the housing 1e of the particulate matter rinsed out of the strands 7 and 8.

FIG. 9 illustrates a filtering apparatus having a housing 1f. A filter element is mounted in the housing 1f. The filter element here includes a support 6 in the form of a perforate plate and short strands 7 of a filtering medium secured to the support 6.

In the embodiment of FIG. 9, a conduit 14 branches off from the outlet 3 provided for filtered fluid whereas a conduit 15 branches off from the inlet 2 provided for the fluid to be filtered. The conduit 14 serves as an inlet conduit for the rinsing fluid while the conduit 15 serves as an outlet conduit for the rinsing fluid.

In operation of each embodiment of the filtering apparatus according to the invention, a liquid or a gas containing particulate matter, e.g. an impure liquid or a contaminated gas, is admitted into the inlet chamber 4 of the housing 1, 1a, 1b, 1c, 1d, 1e or 1f via the inlet 2. The first strong surge of the fluid to be filtered causes the strands 7 and/or 8 of filtering medium secured to the support 6, 6a, 6b or 6c to be pressed together and against the support 6, 6a, 6b or 6c. Depending upon the thicknesses of the strands 7 and/or 8, as well as upon the pressure, a more or less firm filtering mat or bed is thus formed from the strands 7 and/or 8.

After formation of the filtering mat, filtration of the fluid takes place. The purified fluid flows into the outlet chamber 5 of the housing 1, 1b, 1b, 1c, 1d, 1e or 1f and leaves the latter via the outlet 3. The filtering operation continues until the filtering mat becomes saturated or blocked by the particulate matter removed from the fluid.

In order to clean or regenerate the strands 7 and/or 8 of filtering medium, the flow of fluid being filtered is stopped by means of non-illustrated valves provided in the inlet 2 and the outlet 3. Thereafter, a rinsing fluid, which may be a liquid or a gas, is conveyed into the outlet chamber 5 from the branch conduit 14 (FIG. 9) connected to the outlet 3 provided for the filtering fluid. The rinsing fluid flows through the support 6, 6a, 6b or 6c of the filter element in a direction countercurrent to the flow direction during filtration. Accordingly, the rinsing fluid breaks up the filtering mat and causes the strands 7 and/or 8 to project in the direction of flow of the rinsing fluid. As a result, the particulate matter adhering to the strands 7 and/or 8 is rinsed off and forms a suspension in the rinsing fluid. The suspension, which is formed in the inlet chamber 4 provided for fluid to be filtered, leaves the latter and the housing 1, 1a, 1b, 1c, 1d, 1e, or 1f via the branch conduit 15 (FIG. 9) connected to the inlet 2 for fluid to be filtered.

Subsequent to cleaning of the strands 7 and/or 8, these may be dried with a gas. Preferably, a heated gas is used for this purpose. After cleaning and drying, a new filtering cycle may be started.

It will be understood that the strands may be pressed together either gradually or abruptly in order to form the filtering mat. It will also be understood that, in addition to the use of fluid flow, a pressure plate having a plurality of apertures may be utilized for the purpose of pressing the strands together in order to achieve a greater compression of the filtering mat.

When the filter elements according to the invention are used in a plate or disc filter, it is advantageous for the plates of the filter to be divided into individual segments. One reason is to provide a large area for securing from below the fluid-permeable support, e.g. a web, a fabric or the like, which carries the strands. Another reason is to obtain some lateral support for the strands during the process of pressing the strands together.

A large number of the filter elements of the invention, e.g., filter elements having fluid-permeable supports in the form of perforate plates, may be mounted in a single filter housing. In such an event, a plurality of inlet and outlet conduits, each having its own valve, may be provided for the housing and arranged in such a manner that the different filter elements may be contacted with fluid individually. In other words, each filter element may be provided with its own inlet and outlet conduits. This arrangement may, for example, find utility during the pressing together of the strands in that fluid may be supplied to each of the filter elements individually so as to obtain the greatest possible compression of the strands against the respective fluid-permeable supports.

If very fine strands, e.g. heat-resistant strands of synthetic resin, are used for a filtering operation, it is possible to press the strands against the fluid-permeable support with vapor or a heated gas. This enables the strands of filtering medium to be sterilized at the same time that they are pressed against the fluid-permeable support. A filter element which has been treated in such a manner may be used for the sterilization of liquids and gases.

When performing filtrations with fluids containing particulate matter which should be dried subsequent to being filtered out, it is possible to carry out a drying operation after filtration. One manner of accomplishing this is to pass a heated gas through the particulate matter entrapped by the strands of filtering medium. On the other hand, if it is desired to vacuum dry the particulate matter, the housing of the filtering apparatus, as well as the plates of the filtering apparatus in the case of plate or disc filters, may be designed so as to be capable of being heated. Subsequent to the drying operation, the strands may be rinsed with a gas and the dried particulate matter accumulated and recovered.

A filter element according to the invention may include a mixture of thick and thin strands of filtering medium. A particular advantage of using a mixture of thick and thin strands resides in that the strands generally straighten out better during the cleaning or regenerating operation than when using strands of a single type. As a result, the spaces between the strands are increased and the removal of particles from the strands is simplified. The thick and thin strands may also have different lengths and it is possible for either the thick strands to be the longer ones or for the thin strands to be the longer ones. When using a filter element where, for example, the thick strands are also the long strands, a sort of deep-bed filtering layer is obtained during the operation of pressing the strands together. The effectiveness of this filtering layer equals that which is otherwise achieved by the addition of filter aids.

The method and apparatus in accordance with the invention have a multitude of applications. Thus, it is possible to perform a wide variety of filtering operations, drying operations, sterilizing operations, etc. with the method and apparatus of the invention. It is further possible to utilize the invention for catalytic processes by applying catalysts and enzymes to the strands of filtering medium. The utilization of the invention for catalytic processes offers the advantage that the catalysts and enzymes applied to the strands may be satisfactorily cleaned and regenerated while in the housing of the apparatus.

Figure 10A:
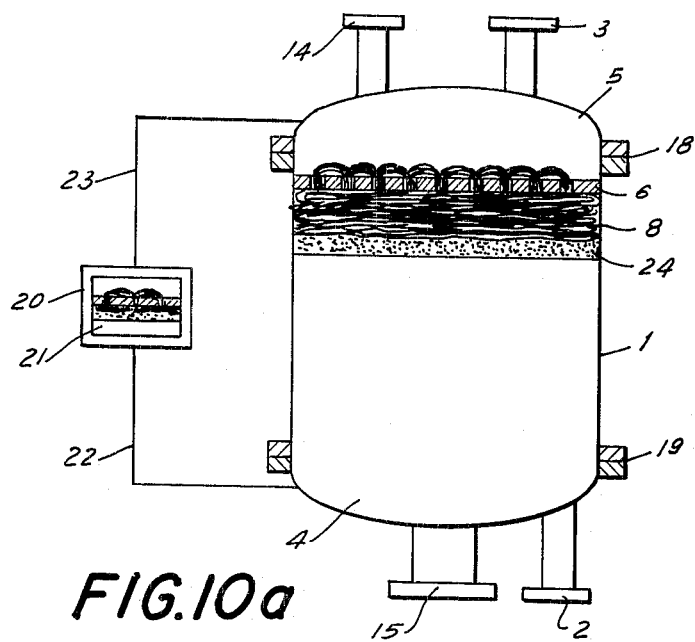
FIGS. 10A and 10B are schematic sectional views of still a further embodiment of a filtering apparatus according to the invention.
Figure 10B:
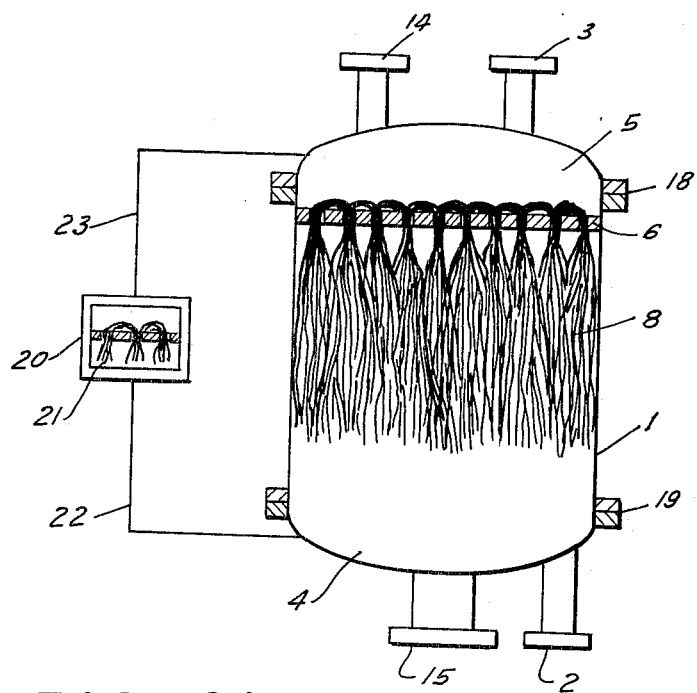

In addition to the above, it has been found that a brush-like or mop-like filter element according to the invention may be incorporated in the observation ports or glasses of pipes to serve as a safety device which indicates the condition of the filter cake building up in a pipe. The embodiment of FIG. 4 is particularly advantageous for this purpose. When a filter element in accordance with the invention is used in such an application, the fluid-permeable support is positioned in the middle of the field of observation of the port. Similarly, a filter element which is arranged in a filtering vessel in such a manner as to extend by an observation glass or port provided in the vessel permits a direct check to be made on the condition of the filter cake in the vessel. FIGS. 10A and 10B illustrate the above mentioned safety device. The filter housing 1 has flanges 18 and 19. Filter element 20 is accommodated in observation port 21 and extends parallel to the filter element 6, 8 located in the housing 1. The inlet chamber 4 and the outlet chamber 5 of the housing 1 are connected with inlets and outlets of the observation port 21 by conduits 22 and 23 respectively. FIG. 10A shows the filtering apparatus during filtering, whereas FIG. B shows it during cleaning. As can be seen from these figures, orientation of the strands of the additional filter element 20 in the port 21 corresponds to the orientation of the strands 8 of the filter element in the housing 1 and thereby indicates the condition of the filter cake building up in the housing.

The brush-like or mop-like filter element according to the invention has also been demonstrated to be suitable for the filtration of waste gases contaminated with radioactive or biological matter. It has been further found that the filter element of the invention lends itself to the removal therefrom of the deposits left behind by such gases. Related fields for which the filter element of the invention is especially well-suited are those of microbiology and nuclear reactor technology.

In connection with the foregoing, it will be apparent that, although the invention has been described primarily with reference to the removal of particulate solids from fluids, the invention has wider application and may be applied generally to the removal of suspended matter from fluids.

It will be understood that each of the elements described above, or two or more together, may also find a useful application in other types of procedures and elements differing from the types described above.

While the invention has been illustrated and described as embodied in a method and apparatus for the removal of particulate solids from fluids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A filtering apparatus for liquid and gases, comprising a housing; and a filter element in said housing, said filter element including a fluid-permeable support which comprises a sheet provided with a plurality of apertures and formed with projections and depressions so as to have a profiled configuration, and a filtering medium for removing suspended matter from fluids, said filtering medium comprising a plurality of fixed strands arranged so that a mat of said strands is present on said support during the filtration of fluids to remove suspended matter from the latter, said strands being pressed into said projections or said depressions and are secured by rods.

2. A filtering method for liquids and gases, comprising the step of providing a filter element which includes a perforated plate having a plurality of apertures and a plurality of mop-like pliable strands which have a length exceeding 15 mm and are supported by said perforated plate so that the major portions of each such strand can float free of said plate when a fluid medium passes through the latter; filtering a fluid medium by passing the same through said filter element in a first direction so that said major portions of said strands become entangled against said plate under the action of said fluid medium and form a mat through which said fluid medium passes and which thereby removes suspended matter from said fluid medium, whereafter the fluid medium passes through said apertures of said perforated plate; and rinsing said filter element by passing a rinsing fluid through said apertures of said perforated plate and through said filter element in a second direction which is opposite to said first direction so that said major portions of said strands become disentangled and float free of the plate, whereby said mat is broken up by said rinsing fluid which then removes adherent matter from said strands so as to regenerate said filter element.

3. A method as defined in claim 1, said rinsing fluid causes said strands to extend in said second direction.

4. A method as defined in claim 3, said fluid medium presses said strands against said support thereby maintaining said mat during the filtering step.

5. A method as defined in claim 1, said rinsing fluid comprising a liquid which causes said strands to straighten and which cleanses said strands; and wherein said strands are dried with a gas subsequent to the rinsing step.

6. A method as defined in claim 1, wherein said fluid medium forms said mat by pressing said strands together.

7. A method as defined in claim 1, wherein said strands are subjected to an abrupt surge of fluid so as to form said mat.

8. A method as defined in claim 1, wherein said strands are dried prior to the rinsing step.

9. A method as defined in claim 1, wherein a catalytic reaction is carried out on said mat.

10. A method as defined in claim 1, wherein said fluid medium is contaminated by radioactive matter which is at least in part removed during the filtering step.

11. A method as defined in claim 1, wherein said fluid medium is contaminated by biological matter which is at least in part removed during the filtering step.

12. A filtering apparatus for liquids and gases, comprising a housing; and a filter element in said housing, said filter element including a support formed as a perforated plate having a plurality of apertures and arranged for passing a filtering fluid through said apertures during travelling in a first direction and for passing a rinsing fluid through said apertures during travelling in a second direction which is opposite to said first direction, and a filtering medium constituted by a plurality of mop-like pliable strands which have a length exceeding 15 mm and are supported by said perforated plate so that the major portions of strands become entangled against said plate under the action of the filtering fluid when the latter travels in said first direction and form a mat through which the fluid medium passes and which thereby removes suspended matter from said filtering fluid, whereafter the fluid medium passes through said apertures of said perforated plate, and said strands become disentangled and float free of said plate under the action of a rinsing fluid when the latter travels through said apertures of said perforated plate in said second direction, whereby said mat is broken up by said rinsing fluid which then removes adherent matter from said strands so as to regenerate said filter element.

13. A filtering apparatus as defined in claim 12, wherein said strands are secured to said plate.

14. A filtering apparatus as defined in claim 13, wherein said strands form bundles on said plate.

15. A filtering apparatus as defined in claim 12, wherein said filtering medium comprises short strands or long strands.

16. A filtering apparatus as defined in claim 12, wherein said filtering medium comprises thick strands or thin strands.

17. A filtering apparatus as defined in claim 12, wherein said filtering medium comprises short strands and long strands.

18. A filtering apparatus as defined in claim 12, wherein said filtering medium comprises thick strands and thin strands.

19. A filtering apparatus as defined in claim 12, wherein said strands comprise at least one member of the group consisting of natural filaments, synthetic resin filaments, glass filaments, graphite filaments and metallic filaments.

20. A filtering apparatus as defined in claim 12, wherein at least some of said strands are constituted by a single filament.

21. A filtering apparatus as defined in claim 12, wherein at least some of said strands are constituted by multiple filaments.

22. A filtering apparatus as defined in claim 12, wherein at least some of said strands comprise spun filaments.

23. A filtering apparatus as defined in claim 12, wherein said support has a substantially horizontal orientation and said strands are arranged so as to lie essentially above said support.

24. A filtering apparatus as defined in claim 12, wherein said support has a substantially horizontal orientation and said strands are arranged so as to lie essentially below said support.

25. A filtering apparatus as defined in claim 12, wherein said support has a substantially horizontal orientation and said strands are arranged so as to lie above and below said support.

26. A filtering apparatus as defined in claim 12, wherein said support has a substantially vertical orientation and said strands are arranged so as to lie essentially on one side of said support only.

27. A filtering apparatus as defined in claim 12, wherein said support has a substantially vertical orientation and said strands are arranged so as to lie on either side of said support.

28. A filtering apparatus as defined in claim 12, wherein said strands are pressed onto said support so as to be secured to the latter.

29. A filtering apparatus as defined in claim 12, comprising rinsing means for conveying a rinsing fluid through said housing.

30. A filtering apparatus as defined in claim 29, said housing being provided with an inlet for fluid to undergo filtration, and an outlet for filtered fluid; and wherein said rinsing means comprises a first branch conduit connected with said inlet and a second branch conduit connected with said outlet, said first branch conduit being a rinsing fluid outlet and said second branch conduit being a rinsing fluid inlet so that the rinsing fluid flows through said filter element in said second direction countercurrent to said first direction of flow of fluid to be filtered.

31. A filtering apparatus as defined in claim 12, comprising at least one additional filter element in said housing, said additional filter element including a perforated plate, and a filtering medium for removing suspended matter from fluids, said filtering medium of said additional filter element comprising a plurality of fixed strands arranged so that a mat of said strands is present on said support of said additional filter element during filtration of fluids to remove suspended matter from the latter; and wherein said housing is provided with a pair of discrete inlets for fluid to undergo filtration, and a pair of discrete outlets for filtered fluid, each of said inlets opening to a different one of said filter elements and each of said outlets also opening to a different one of said filter elements.

32. A filtering apparatus as defined in claim 12, said housing being provided with an observation port; and wherein said filter element is built into said observation port.

33. A filtering apparatus as defined in claim 12, wherein said strands extend through said apertures of said perforated plate.

* * * * *